(12) United States Patent
Verma et al.

(10) Patent No.: US 7,680,794 B2
(45) Date of Patent: **\*Mar. 16, 2010**

(54) NEIGHBORING LOCKING TECHNIQUE FOR INCREASING CONCURRENCY AMONG TRANSACTIONS

(75) Inventors: Sanjay Verma, Foster City, CA (US); Sibsankar Haldar, Madhyamgram (IN); Chi-Kim Hoang, Palo Alto, CA (US); Sherry Listgarten, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 11/757,804

(22) Filed: Jun. 4, 2007

(65) Prior Publication Data

US 2007/0233684 A1    Oct. 4, 2007

Related U.S. Application Data

(63) Continuation of application No. 10/671,297, filed on Sep. 24, 2003, now Pat. No. 7,269,588.

(51) Int. Cl.
*G06F 17/30* (2006.01)
*G06F 7/00* (2006.01)
(52) U.S. Cl. .......................................... 707/8
(58) Field of Classification Search .................. 707/8
See application file for complete search history.

(56) References Cited

U.S. PATENT DOCUMENTS

| | | |
|---|---|---|
| 4,627,019 A | 12/1986 | Ng |
| 4,875,159 A | 10/1989 | Cary et al. |
| 5,170,480 A | 12/1992 | Mohan et al. |
| 5,280,612 A | 1/1994 | Lorie et al. |
| 5,313,629 A | 5/1994 | Abraham et al. |
| 5,390,316 A | 2/1995 | Cramer et al. |
| 5,410,697 A | 4/1995 | Baird et al. |
| 5,423,037 A | 6/1995 | Hvasshovd |
| 5,440,727 A | 8/1995 | Bhide et al. |
| 5,452,445 A | 9/1995 | Hallmark et al. |
| 5,485,607 A | 1/1996 | Lomet et al. |
| 5,497,483 A | 3/1996 | Beardsley et al. |
| 5,555,404 A | 9/1996 | Torbjornsen et al. |
| 5,577,240 A | 11/1996 | Demers et al. |

(Continued)

FOREIGN PATENT DOCUMENTS

WO        WO 01/77908        10/2001

OTHER PUBLICATIONS

Bernstein, P.A., et al., "Concurrency Control and Recovery in Database Systems; Multiversion Concurrency Control," Concurrency Control and Recovery in Database Systems, Addison-Wesley, pp. 143-166, 1987.

(Continued)

*Primary Examiner*—John R. Cottingham
*Assistant Examiner*—Kimberly Lovel
(74) *Attorney, Agent, or Firm*—Stolowitz Ford Cowger LLP

(57) ABSTRACT

New lock modes are based on the concept of neighborhoods and are applied to spaces in indexes. The new lock modes include a Read, or shared, neighborhood (Snei) lock mode and a Write neighborhood (Xnei) that enhance concurrency among non-serializable transactions.

19 Claims, 4 Drawing Sheets

U.S. PATENT DOCUMENTS

| | | | |
|---|---|---|---|
| 5,586,310 | A | 12/1996 | Sharman |
| 5,621,795 | A | 4/1997 | Baker et al. |
| 5,701,480 | A | 12/1997 | Raz |
| 5,708,812 | A | 1/1998 | Van Dyke et al. |
| 5,737,601 | A | 4/1998 | Jain et al. |
| 5,758,337 | A | 5/1998 | Hammond |
| 5,781,910 | A | 7/1998 | Gostanian et al. |
| 5,796,999 | A | 8/1998 | Azagury et al. |
| 5,806,075 | A | 9/1998 | Jain et al. |
| 5,809,503 | A | 9/1998 | Aoshima |
| 5,852,715 | A | 12/1998 | Raz et al. |
| 5,870,758 | A | 2/1999 | Bamford et al. |
| 5,923,833 | A | 7/1999 | Freund et al. |
| 5,974,427 | A | 10/1999 | Reiter |
| 6,009,425 | A | 12/1999 | Mohan |
| 6,122,645 | A | 9/2000 | Bohannon et al. |
| 6,233,585 | B1 | 5/2001 | Gupta et al. |
| 6,295,610 | B1 | 9/2001 | Ganesh et al. |
| 6,351,753 | B1 | 2/2002 | Jagadish et al. |
| 6,502,133 | B1 | 12/2002 | Baulier et al. |
| 6,631,478 | B1 | 10/2003 | Wang et al. |
| 6,647,510 | B1 | 11/2003 | Ganesh et al. |
| 7,236,974 | B2 * | 6/2007 | Bhattacharjee et al. ......... 707/8 |
| 2003/0078910 | A1 | 4/2003 | Kenai et al. |
| 2003/0200212 | A1 | 10/2003 | Benson et al. |
| 2004/0015642 | A1 | 1/2004 | Moir et al. |
| 2004/0139116 | A1 | 7/2004 | Porter |
| 2004/0205066 | A1 | 10/2004 | Bhattacharjee et al. |
| 2004/0220933 | A1 | 11/2004 | Walker |
| 2004/0267747 | A1 | 12/2004 | Choi et al. |

OTHER PUBLICATIONS

Anonymous, "Bonus C for Dummies Lesson 17-6—Sorting a Structure," Internet Article, Online! 2002, pp. 1-3. www.c-for-dummies.com/lessons/chapter.17/06. Retrieved on Dec. 21, 2004.

Mohan, C., et al., "Efftient and Flexible Methods for Transient Versioning of Records to Avoid Locking by Read-Only Transaction," Proceedings of the ACM SIGMOD International Conference on Management of Data, pp. 124-133, San Diego, Jun. 2-5, 1992.

Greenwald et al., "Oracle Essentials: Oracle 8 & Oracle 8i—Chapter 7, Multiuser Concurrency," Internet article, Online! Oct. 1999, pp. 1-7. www.cs,wisc.edu/{cs764-1/oracle.locking.html. Retrieved on Dec. 23, 2004.

Molesky et al, "Recovery Protocols for Shared memory Database Systems"; Association of Computing Machinery; 1985; pp. 11-22.

Agrawal, D, Krishnaswamy, V. "Using multiversioning data for non-interfering execution of write-only transactions", SIGMOD Conference 91, 98-107.

Ahuja, M., Browne, J,, "Performance Evaluation of Two Concurrency control Protocols for distributed data bases with multi-versioned entities", IEEE 1988, 426-436.

Bayer, R., Heller H., Reiser, A.,"Parallelism and Recovery in Database", Transactions on Database Systems, vol. 5, No. 2, pp. 139-156, Jun. 1980.

Bernstein, P. and Goodman, N., "Multiversion Concurrency Control—Theory and Algorithms", ACM Transactions and Database Systems, vol. 8, No. 4, pp. 465-483, Dec. 1983.

Berenson, et al., A critique of ANSI SQL Isolation Levels, SIGMOD, San Jose, California 1995.

Bober, P., Carey, M. "On Mixing Queries and Transactions via Muitiversion Locking", ICDE Madison, Wisconsin, 1992: 535-545.

Mohan, C., "ARIES/KVL: A Key-Value Locking Method for Concurrency Control of Multiaction Transactions Operating on B-Tree Indexes," Proceedings of 16th VLDB Conference, Brisbane, Australia, Aug. 1990, pp. 392-405.

Mohan, C.et al,, "ARIES/IM: An Efficient and High Concurrency Index Management Method Using Write-Ahead Logging," 1992 ACM SIGMOD, California, Jun. 1992, pp. 371-380.

Bober, P., Carey, M., "Indexing for multiversion locking: alternatives an performance evaluation", IEEE Transactions on Knowledge and Data Engineering, vol. 9, No. 1, Jan.-Feb. 1997.

Chan, A. et al, "The implementation of an Integrated Concurrency Control and Recovery Scheme", Proceedings of the Association for Computing Machinery SIGMOD International Conference on Management of Date, Orlando, Florida, Jun. 1982.

Lomet, D., MLR: A Recovery Method for Multi-level systems, ACM SIGMOS 1992.

Kempster, T. et al., Diluting Acid, SIGMOD Record, vol. 28, No. 4, Dec. 1999.

Lamport, L., On Interprocess Communication, Part I: Basic Formalism and Part II: Algorithms, Distributed Computing 1 (2): 77-101, 1986.

Lomet, D., et al. "Access methods for multiversion data", D. Lomet, B. Saizberg, SIGMOD Conference 1989; 315-324.

Mohan, C., "Commit_LSN: A novel and simple method for reducing locking and latching in transaction processing systems", 16th VLDB Conference (Brisbane, Australia), Aug. 1990.

Mohan,C., Pirahesh, H., Lorie, R., "Efficient Flexible Methods for Transient Versioning of records to avoid locking by read-only transactions", ACM SIGMOD 1992.

Oracle 9i Database concepts, Chapter 22, Date Concurrency and Consistency, on-line documentatior at http://doc.oracle.com, Jul. 2001.

Bober, P., Carey, M., "Multiversion Query Locking", P. Bober, M. Carey, Proceedings of the 18th VLDB Conference (Vancouver, British Columbia, Canada) 1992.

Reed, D., PhD Thesis, "Naming and Synchronization in a Decentralized Computer System", Technical Report MIT/LCS TR-205, Massachusettes institute of Technology, pp. 1-181, Sep. 1978.

Robinson, J. et al,, "Elimination of Lock Contention and Relational Databases Accessed by Read-Only Queries and On-Line Update Transactions", IBM Technical Disclosure Bulletin, pp. 180-185, Jun. 1988.

Stearns, Richard E. et al., "Distributed Database Concurrency Controls Using Before-Values", Proceedings of the Association for Computing Machinery SIGMOD international Conference on management of Data, Ann Arbor, Michigan, pp. 74-83, Apr. 1981.

"Times-Ten Team: In-Memory Data Management for Consumer Transactions The Times Then Approach", SIGMOD conference, Philadelphia, PA, pp. 528-529, 1999.

Weikum, G., A theoretical foundation of multi-level concurrency control, Proc. Of ACM PODS Conf., Mar. 1986.

Weikum G. Principles and realizations strategies of multilevel transaction management, ACM Transactions and Database Systems, vol. 16, No, 1, pp. 132-180, Mar. 1991.

Communication regarding examination of European Patent Application No. 04 780 485.1-1243 dated Feb. 15, 2007.

US 5,287,495, 02/1994, Chen at al. (withdrawn)

* cited by examiner

ALREADY HELD MODE →

| REQUESTED MODE ↓ | NULL | IS | S | Sn | IX | SIX | U | X | Xn | Xnei | Un | Snei |
|---|---|---|---|---|---|---|---|---|---|---|---|---|
| NULL | 1 | 1 | 1 | 1 | 1 | 1 | 1 | 1 | 1 | 1 | 1 | 1 |
| IS | 1 | 1 | 1 | 0 | 1 | 1 | 0 | 0 | 0 | 0 | 0 | 0 |
| S | 1 | 1 | 1 | 1 | 0 | 0 | 0 | 0 | 0 | 0 | 0 | 1 |
| Sn | 1 | 0 | 1 | 1 | 0 | 0 | 0 | 0 | 0 | 1 | 0 | 1 |
| IX | 1 | 1 | 0 | 0 | 1 | 0 | 0 | 0 | 0 | 0 | 0 | 0 |
| SIX | 1 | 1 | 0 | 0 | 0 | 0 | 0 | 0 | 0 | 0 | 0 | 0 |
| U | 1 | 1 | 1 | 1 | 0 | 0 | 0 | 0 | 0 | 0 | 0 | 1 |
| X | 1 | 0 | 0 | 0 | 0 | 0 | 0 | 0 | 0 | 0 | 0 | 0 |
| Xn | 1 | 0 | 0 | 0 | 0 | 0 | 0 | 0 | 0 | 1 | 0 | 1 |
| Xnei | 1 | 0 | 0 | 1 | 0 | 0 | 0 | 0 | 1 | 1 | 1 | 1 |
| Un | 1 | 0 | 1 | 1 | 0 | 0 | 0 | 0 | 0 | 1 | 0 | 1 |
| Snei | 1 | 0 | 1 | 1 | 0 | 0 | 1 | 0 | 1 | 1 | 1 | 1 |

NEIGHBORING LOCKING TECHNIQUE FOR INCREASING CONCURRENCY AMONG TRANSACTIONS

CROSS-REFERENCE TO RELATED APPLICATION

The present application is a continuation of U.S. patent application Ser. No. 10/671,297, filed Sep. 24, 2003, which is incorporated herein by reference in its entirety for all purposes.

FIELD OF INVENTION

The invention relates to the field of data processing systems. More specifically, the invention relates to the locking techniques for management of data in database systems and modes of locks acquired on various data items.

BACKGROUND OF INVENTION

A database management system (DBMS) supports transactions to access data items stored in a database. Before actually accessing the items, a transaction acquires locks on the data items that it wishes to access. Typically, a read only or read/write access may be requested on the data item. Generally, this is termed as shared and exclusive access in the literature. Thus locks are requested in a pair <resource, lock mode>, where the lock mode indicates the kind of access the transaction needs on the resource. Typically these modes are denoted as S or X lock modes. If a transaction owns an X lock on a given resource, no other transaction can own any lock in any mode on that resource. This is generally known as a lock conflict. Thus X conflicts with all other modes, and S conflicts with X mode. However, S is compatible with another S mode lock on the resource.

In the interest of performance, often it is useful to define structure on data. For example, data in a typical database can be classified into tables and records in a table. An X lock on a table can be considered as an X lock on all rows in the table. This technique is termed as hierarchical locking. Only using X and S locks are inadequate in supporting hierarchical locking, and therefore a typical DBMS supports many more lock modes, to enhance transaction concurrency.

For example, most DBMSs use IS, S, IX, X, SIX and U lock modes for controlling concurrent accesses to data items. The IS mode refers to intention shared (obtained on the table), intention to take S locks on underlying rows. The IX mode refers to intention exclusive (obtained on the table), intention to take X locks on underlying rows. The S mode refers to shared, if obtained on the table, implies an S lock on all underlying rows. The SIX mode refers to shared intention exclusive, a combination of S and IX, obtained on the table. The U mode refers to update lock (can be obtained on the table), it means that a X lock may requested on the data item in the future.

Typically a database consists of isolated transactions. The degree of isolation may vary among transactions. The American National Standards Institute (ANSI) has defined various degrees of isolation from strict SERIALIZABLE to DIRTY READ. Existing lock modes may be sufficient to synchronize data access among serializable transactions. But, the lock modes described above are too restrictive in terms of avoidable conflicts as per the semantics of non-serializable transactions.

SUMMARY OF THE INVENTION

New lock modes are based on the concept of neighborhoods and are applied to spaces in indexes. The new lock modes include a Read, or shared, neighborhood (Snei) lock mode and a write neighborhood (Xnei) that enhance concurrency among non-serializable transactions.

DETAILED DESCRIPTION

Figure 1:
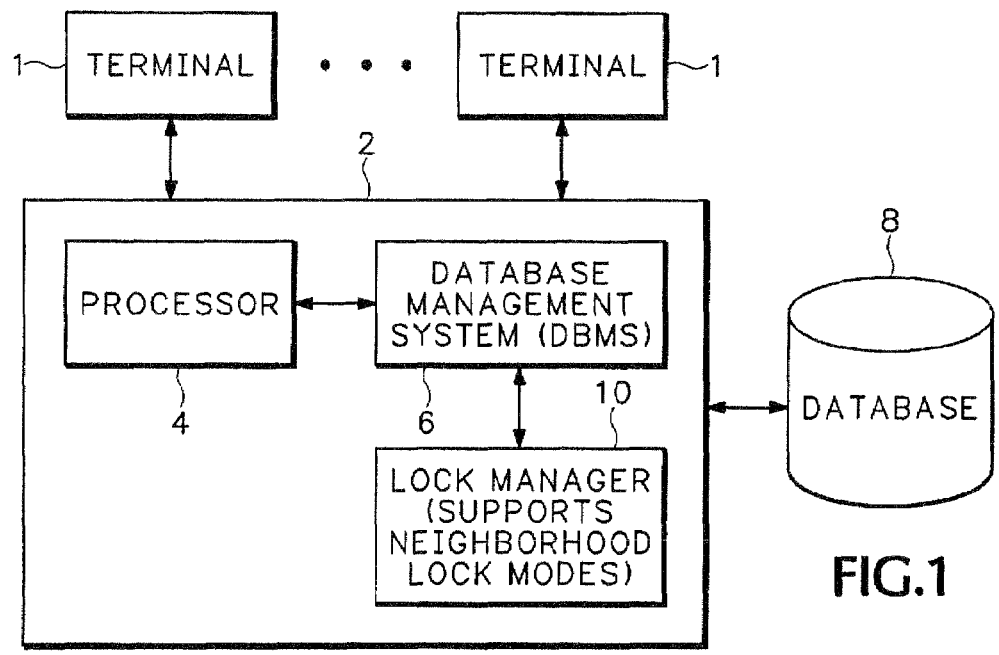
FIG. 1 is a diagram of a database management system that supports neighborhood lock modes.

FIG. 1 shows a database system that includes database 8 and a processor 4 (Central Processing Unit (CPU) and memory) that stores and executes software for a Database Management System (DBMS) 6 and a lock manager 10. A computing device 2 containing processor 4 in one example is a server. The processor 4 may be a single CPU or multiple CPUs that operate in the server 2. The database 8 is typically stored on a plurality of Direct Access Storage Devices (DASDs) although only one such device is illustrated in FIG. 1. The DASDs may be, for example, disk packs, and it will be understood by those skilled in the art that the database system includes the required DASD controllers and channels that establish the communication between the database 8 and the processor 4. In another example the database (8) may be stored inside the main memory (4) itself.

Terminals 1 are any Input/Output (I/O) device that accepts requests from and returning results to users. For example, the terminals may be Personal Computers (PCs) or applications that use the advertised application programmer interface (API). Transactions and queries are submitted from the terminals 1 and are processed concurrently by the DBMS 6.

A Lock Manager (LM) 10 is a module of the DBMS 6 that helps the transactions in acquiring and releasing the locks on data items in the database 8 in a controlled manner. The LM 10 needs to make sure that conflicting accesses to a given data item are not granted simultaneously. For example, if a simultaneous read and write access has been granted on a data item, then the reader of that data item may see an incomprehensible state of the data item. Thus some lock requests may not be granted to different transactions simultaneously, since there can be conflicts in the lock grant requests.

All transactions request that locks be granted in a desired lock mode. For example, the reader may request a lock in S mode and a writer may request the same lock in X mode. If S and X are defined not be compatible, then the LM 10 guarantees that no writer has access permission. In other words, no X lock exists on the data item if a S lock has already been obtained on that data item. Thus a reader can read a consistent state of the data item after S lock has been obtained on that data item. The LM 10 uses these and other conventional lock modes along with new neighborhood based lock modes described below.

Figure 2:
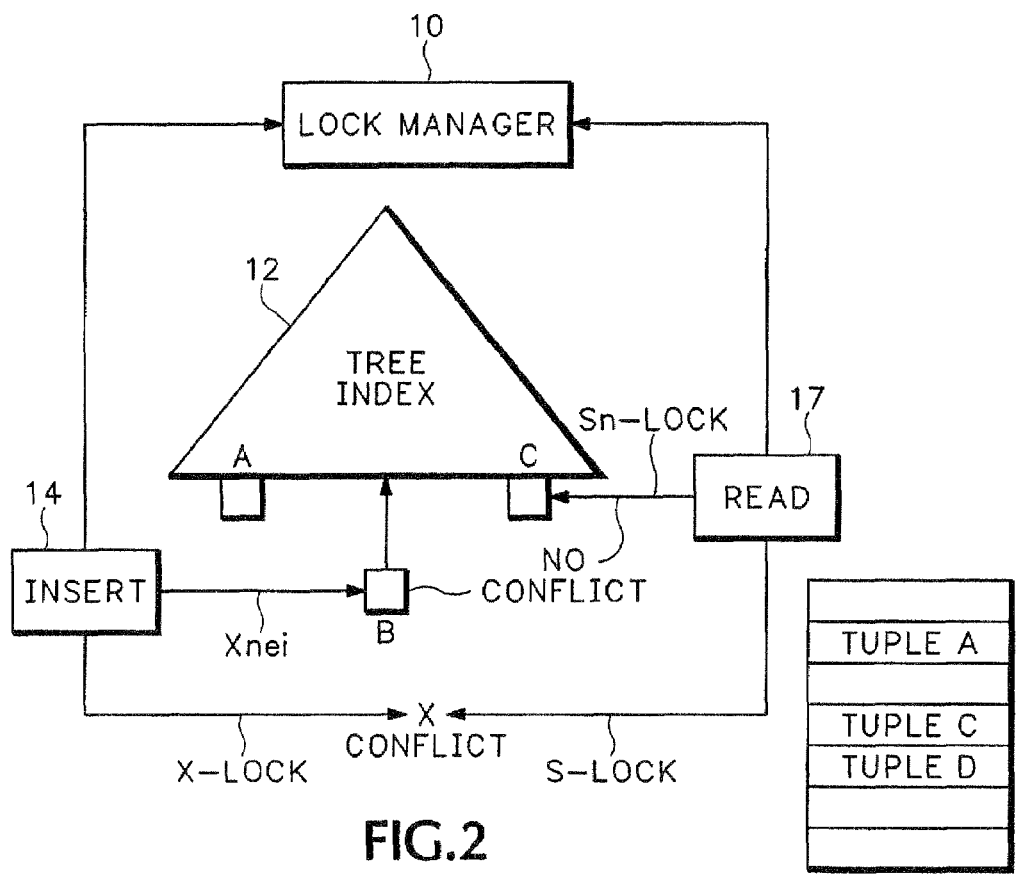
FIG. 2 is a schematic diagram showing locking operations in the database management system.

Referring to FIG. 2, the triangle represents a tree index 12. A range of values in the index 12 is locked by always ensuring that the next tuple via the index 12 is locked at the end of select, insert and delete operations. Consider an example of the usage of the aforementioned lock modes in the case of an insert operation 14 and a read operation 17, both executing under a non-serializable isolation mode. Additionally, assume that the read operation 17 uses the tree index 12. Also assume that the DBMS 6 (FIG. 1) is designed to support serializable scans when using the tree index 12.

The items A and C represent tuples in a table 16, on which the index 12 is defined. Assume that the read operation 17 has already visited A and C. The insert operation 14 needs to insert a new tuple B that is positioned in the index 12 between A and C. At this point, before allowing the insert operation 14 to insert tuple B in the index 12, the lock manager 10 must ensure that no serializable scanner (the read operation 17) has looked at the surrounding area that includes tuples A and C. Otherwise the read operation 17 will be non repeatable even for serializable transactions.

Consider that the read operation 17 holds a lock on tuple C in "S" lock mode. At this point the insert operation 14 needs to lock what will be the tuple next to tuple B in the index 12, i.e. tuple C. The insert operation 14 checks if a read operation under serializable isolation has read tuple C or not. If the insert operation 14 can request an X lock on tuple C, for instant duration, inserts in the same area could be concurrent. But as can will be seen from the compatibility matrix in FIG. 7, the lock manager 10 with not allow the insert operation 14 to lock on tuple C in mode "X" until the "S" lock on tuple C is released by read operation 17.

New lock modes Snei and Xnei are recognized by the lock manager 10 and allow the insert operation 14 to succeed when there is no serializable reader in the vicinity. The Snei lock mode refers to a read on the neighborhood. The Xnei lock mode refers to write permission on the neighborhood. In one embodiment, these two lock modes may be used for tuples accessed by non-serializable transactions. Serializable transactions, on the other hand, hold these locks implicitly since they hold stronger locks on the tuple.

For example, the read operation 17 may be a non serializable read operation in the mode Sn, which stands for S-non-serializable. The insert operation 14 then requests a Xnei lock mode through lock manager 10, which is compatible with Sn, and therefore granted. Thus the insert operation 14 allowed to succeed by the lock manager 10 even in the presence of concurrent non-serializable read operation 17 in the same vicinity.

Let (V,<) be a totally ordered set. Let v be an element of V. By the left neighborhood of v in V, we mean the subset $\{v'|v'<v\}$ of V. Suppose we are given an ordered sequence $v_1, v_2, v_3, \ldots$ of elements from V. By the least left neighborhood of element $v_i$ relative to the given ordered sequence we mean the subset $\{v|v_{i-1}<v<v_i\}$ of the left neighborhood of $v_i$. This set represents the 'gap or space' in the given sequence, that is, all the elements in the set can be inserted between $v_{i-1}$ and $v_i$, and no more elements from V can be inserted there without violating the given ordering.

Figure 3:
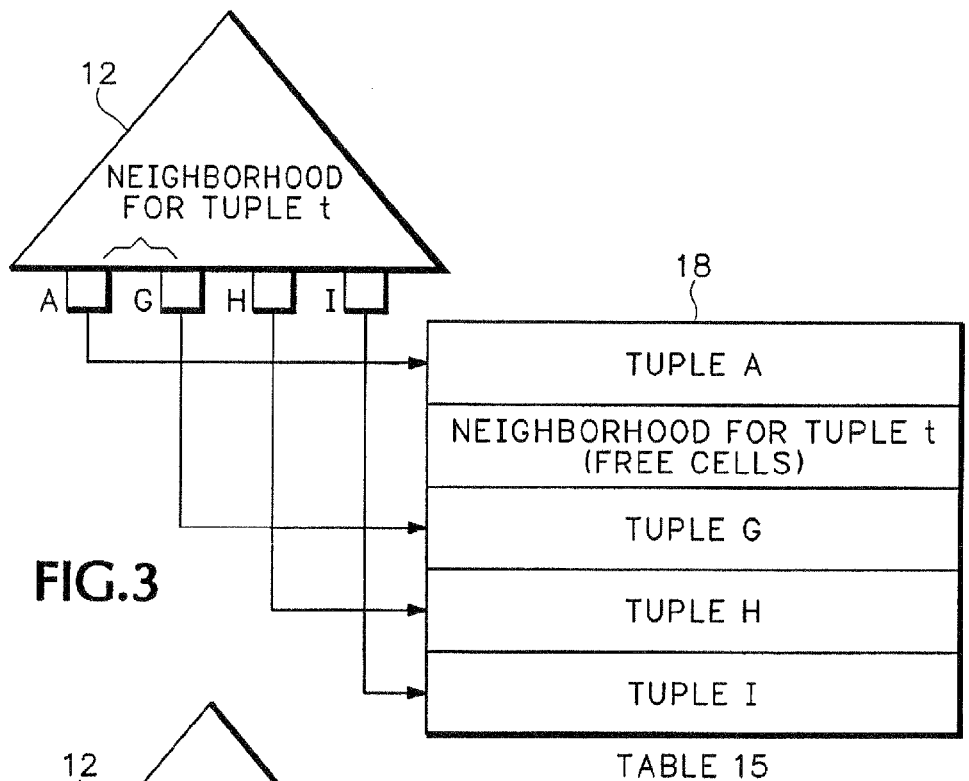
FIG. 3 is a schematic diagram showing a neighborhood associated with a tuple.

Referring to FIG. 3, each table 15 stores tuples from a predefined countable domain D of tuples. All tuples can be ordered in domain D in many different ways. For a database system, these orderings are generally determined by ordered indices defined on the table 15. There is also a natural physical ordering for each table 15. The left neighborhood for a tuple relative to the physical ordering consists of all free cells that lie before the tuple in the corresponding table 15. For example, the neighborhood for tuple G in FIG. 3 are the free cells 18 that reside before tuple G but after tuple A.

Only a subset of domain D will be present in table 15. The tuple G will have different least left neighborhoods relative to the total orderings defined by the index 12 and the physical ordering on table 15. The neighborhood of tuple G is defined as the union of all its least left neighborhoods 18. The neighborhood 18 can be visualized as the corresponding gaps to the left of tuple G in all index trees 12 and the physical representation of the table 15.

A tuple G and its neighborhood 18 are two different, though tightly related, entities. Transactions distinguish between access permission that they have on the tuple G and access permission on the neighborhood 18. A transaction may be allowed to read and/or write the neighborhood 18 of tuple G, even when it has no access permissions on the tuple G.

Figure 4:
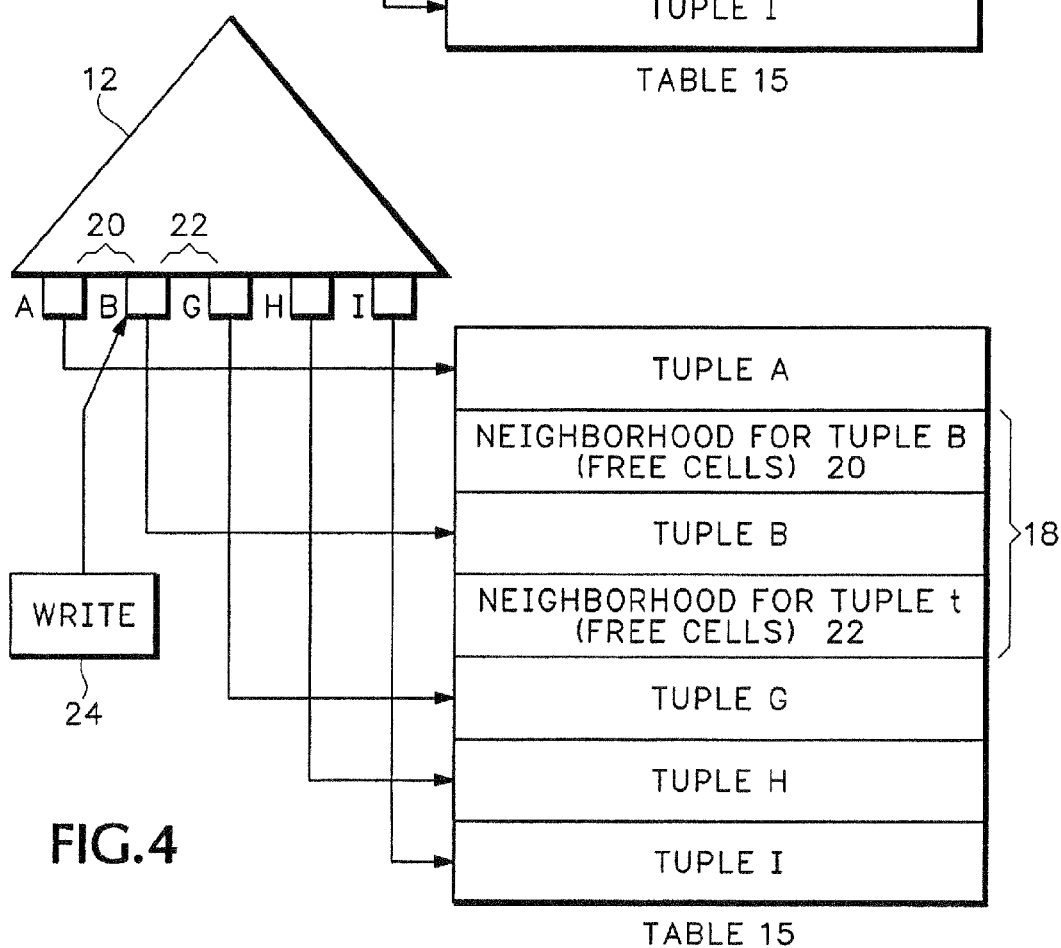
FIG. 4 is a schematic diagram showing how a write operation inserts a tuple into the neighborhood.

Referring to FIG. 4, a write operation 24 on the neighborhood 18 splits the neighborhood 18 into two neighborhoods 20 and 22 by inserting a new tuple B in the original neighborhood 18. A read operation of a neighborhood, is a fictitious reading of a fictitious tuple in the neighborhood.

The Snei and Xnei lock modes are compared with read and write operations that use eleven lock modes: IS, S, IX, X, SIX, U, Sn, Xn, Un, Xnei and Snei. The Sn, Xn, and Un lock modes are the counter parts of S, X and U, but are only used by non-serializable transactions. The S, X, U, Sn, Xn, Un, Xnei and Snei modes are used to lock tuples and their neighborhoods, and IS, S, IX, X, SIX and U modes are used to lock tables. The semantics of these lock modes are described below.

Figure 5:
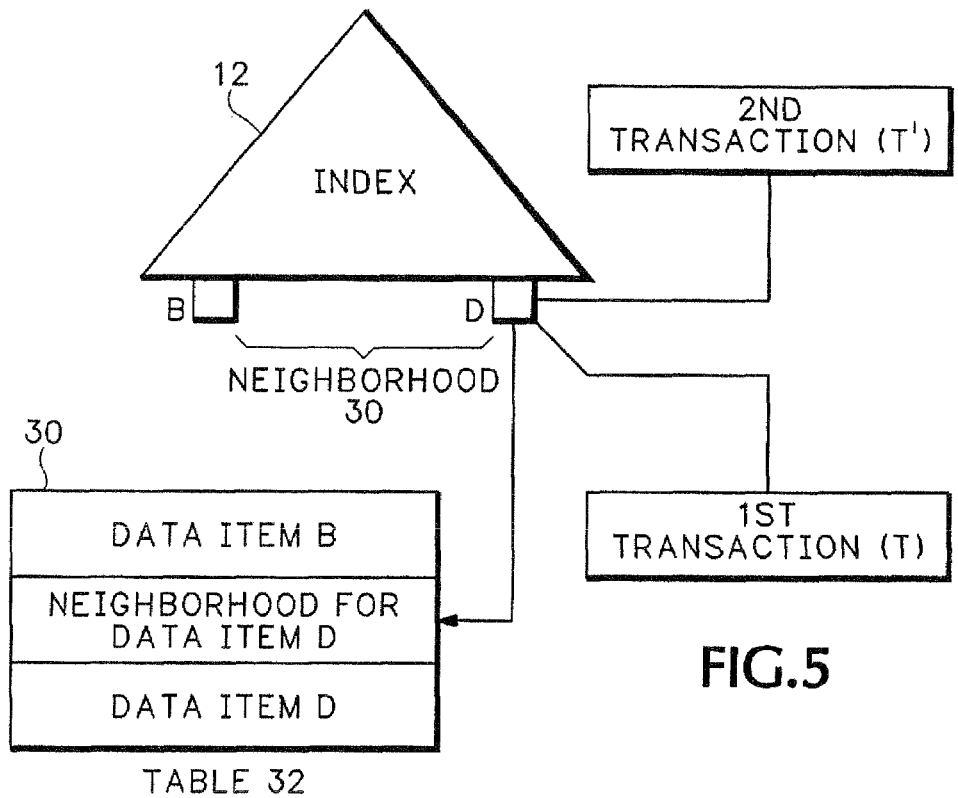
FIG. 5 is a schematic diagram showing how two transactions operate concurrently with respect to the neighborhood.

Referring to FIG. 5, suppose a transaction T holds a lock on a data item d. What transaction T can do with data item d and/or its neighborhood 30 (if d is a tuple) is explained below. Also, discussed below is what another transaction T' can or cannot do with data item d and/or its associated neighborhood 30. Data items contained in a course granule are referred to as ingredients.

S—Shared: transaction T locks data item d and the neighborhood 30 in shared mode. Any transactions changing data item d or the neighborhood 30 are prohibited. Transaction T can read data item d and its ingredients, but it cannot write them. Transaction T also cannot modify the data neighborhood. A second transaction T' can read data item d and its ingredients. Transaction T' cannot write data item d or its ingredients, nor modify the data neighborhood 30.

IS—Intention shared: Transaction T is planning to read some lower level data item (row) of the table 32. Transaction T cannot read the lower level portion of table 32 until it obtains a lock on the related data item d.

X—Exclusive: Transaction T locks data item d and the neighborhood 30 in exclusive mode. No other transactions are allowed to be active on data item d or the neighborhood 30, not even in Snei mode. Transaction T can read and write data item d and its ingredients. Transaction T can also modify the neighborhood 30. Transaction T' cannot read or write data item d or its ingredients, nor modify the data neighborhood 30.

IX—Intention exclusive: Transaction T is planning to write some lower level data item (row) of the table 32. Transaction T cannot read or write any row in the table 32 until proper locks are obtained on the row.

SIX—Shared intention exclusive: Transaction T requests this lock mode on table 32 when transaction T needs to read many rows on table 32 but write only a few rows. Transaction T can read rows of table 32, but it cannot write any row of table 32 without a proper lock on the row. Transaction T' can only read rows of table 32 after obtaining proper locks.

U—Update: A transaction that reads a data item but expects to write the same data item later locks the data in U mode to convert it later to X mode if it writes or to S mode if it decides not to write the data. This mode helps in avoiding deadlocks in converting S locks to X locks. Transaction T can read, but not write, d and its ingredients and cannot modify the neighborhood 30 if data item d is a tuple. Transaction T' cannot obtain a new read/write permission for data item d or its ingredients. However, transaction T' can read data item d and its ingredients if it has already got permission to do so. It cannot write data item d or any ingredients, nor modify the neighborhood 30.

Figure 6:
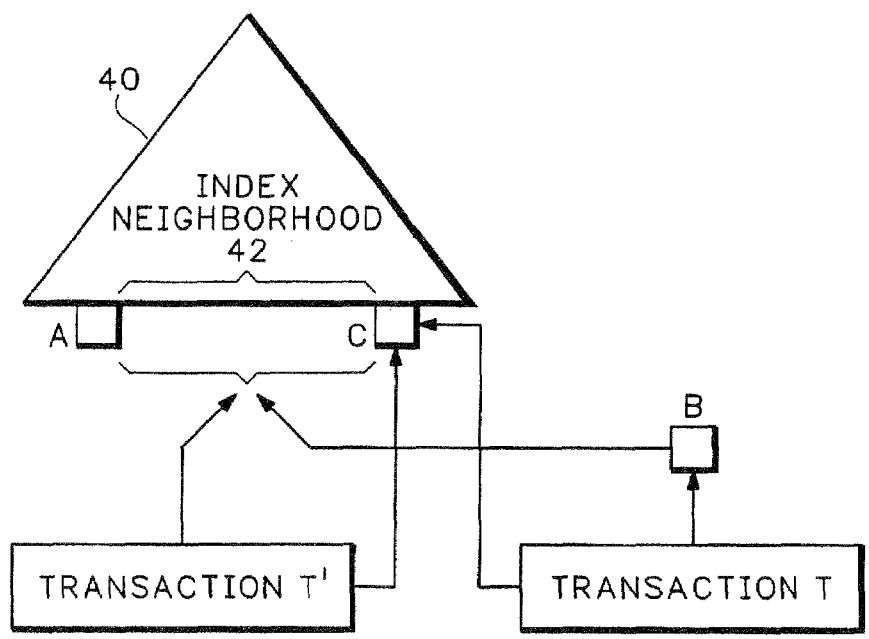
FIG. 6 is a schematic diagram showing how the two transactions can both operate concurrently during an insert operation.

Referring to FIG. 6, the following modes are used to promote a higher level of concurrency for non-serializable isolation levels, especially for scanning tables: physical, hash, or a tree index. These modes are valid for locking tuples. In FIG. 6, data items A and C represent pointers in an index 40 that point to associated tuples A and C, respectively. Data Item A is the next reserved data item to the left of data item C. The neighborhood 42 for tuple C is the free space in a table (not shown) between tuples A and C.

Sn—Non-serializable shared: Transaction T locks tuple C in shared mode, but does not lock its neighborhood 42. Transaction T can read tuple C, but cannot write it. Transaction T cannot modify the tuple neighborhood 42. Transaction T' can read tuple C, but cannot write it. However, transaction T' can modify the tuple neighborhood.

Xn—Weak exclusive: Transaction T locks tuple C in exclusive mode, but does not lock its neighborhood 42. Transaction T can read and write tuple C but cannot modify the tuple neighborhood 42. Transaction T' cannot read or write tuple C but can modify the tuple neighborhood 42.

Xnei—Weak Exclusive neighborhood lock: Transaction T does not want to read or write tuple C. Transaction T locks the neighborhood 42 for shrinking by inserting a new tuple B. Transaction T cannot read or write tuple C but can shrink the tuple neighborhood 42. Transaction T' can read and write tuple C and can also shrink the tuple neighborhood 42. Note that transaction T' cannot have an X lock on tuple C. This means that transaction T' cannot have exclusive rights over the neighborhood 42.

Un—Non-serializable update: Transaction T locks tuple C in shared mode, but expects to write it soon. Transaction T does not have interest in the tuple neighborhood 42. Transaction T can read tuple C, but cannot write it and cannot modify the tuple neighborhood 42. Transaction T' cannot obtain a new read/write permission for tuple C. However, transaction T' can read tuple C if it has already got permission to do so, but it cannot write tuple C. Transaction T' can also modify the tuple neighborhood 42.

Snei—Weak Shared neighborhood lock: This operation is an indication that transaction T has finished an ongoing orderly scan. The lock acts as a sentry for transaction T. Transaction T cannot read or write tuple C and cannot modify the tuple neighborhood 42. Transaction T' can read and write tuple C and can modify the data neighborhood 42. Transaction T cannot have an X lock on tuple C.

Figures 7, 8:
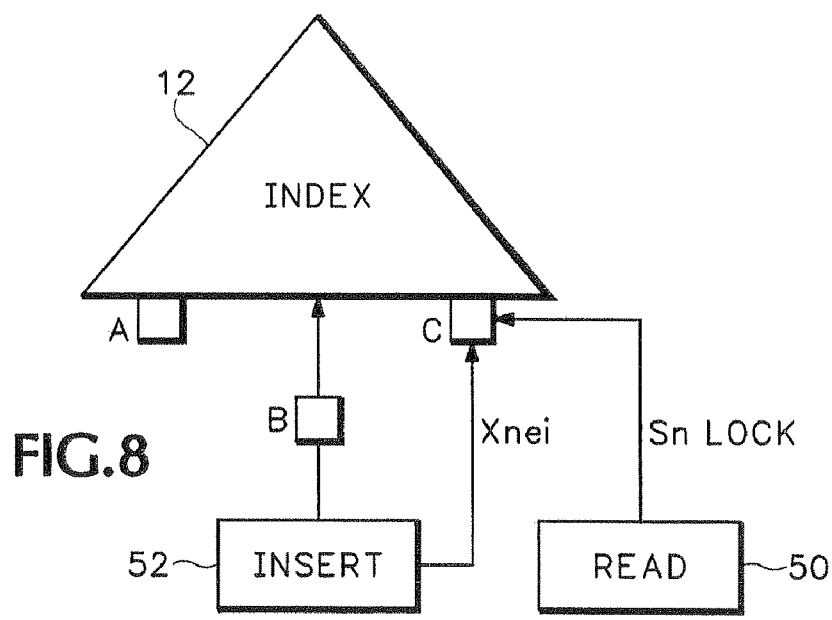
FIG. 7 is a table showing how neighborhood lock modes operate with respect to other lock modes.
FIG. 8 is a schematic diagram showing how a read operation operates concurrently with a neighborhood insert operation.

A lock compatibility matrix is shown in FIG. 7 for some of the various lock modes described above. Each row defines what happens when a new lock request is made on the same resource with the given lock mode, and a previous lock exists on the same resource in the mode indicated by the columns. An entry of one means that the new lock mode can be granted, given the existing resource lock. A value of zero means that the new lock cannot be granted. A lock request can be granted only if it is compatible with all locks that are currently held on the given resource. In one example, the matrix shown in FIG. 7 is stored in memory somewhere in the server 2 (FIG. 1). The lock manager 10 (FIG. 1) is operated by the processor 4 and uses the matrix to determine when to grant lock modes to different transactions.

One example is described in FIG. 8. If a read operation 50 on tuple C is non-serializable, then it will hold a Sn lock on tuple C. An insert operation 52 wants to insert tuple B and needs to lock the neighborhood of tuple B. The insert operation 52 requests and is granted a Xnei lock on tuple C. In the non-serializable mode, the insert operation 52 and the read operation 50 will be concurrent without any lock conflict. In other words, the Sn lock on tuple C and the Xnei lock on tuple C exist concurrently.

On the other hand, if the read operation 50 is a serializable reader, it will hold a S lock on tuple C. Since Xnei is not compatible with the serializable S lock, the insert operation 52 will have to wait for the serializable read operation 50 to commit or rollback. This maintains serializability for the read operation 50, by maintaining the repeatable read semantics for the serializable operation.

The lock modes described above are superior to other lock modes. Assume two non-serializable operations delete separate rows B and C such that row B is next to row C, and row C is next to row D in a non-unique index. In other DBMSs, the delete for row B takes an X lock on row B and a X (or other proprietary weaker locking modes e.g. NX in IBM's DB2) lock on row C. At this point the delete for row C cannot proceed since it needs a X lock (or at least a W lock in IBM's DB2), on row C. In the neighborhood locking scheme, the delete for row B can take a Xw lock on row B and a Xnei lock on row C. The delete for row C takes a Xw lock on row C, which is compatible and an Xnei lock on row C. Thus both deletes are concurrent.

All database operations can be reduced to four basic tuple operations. A transaction may request a read of a given tuple, an insert of a new tuple, a delete of a given tuple, and an update of a given tuple. A read operation typically reads a range via an index. Since the neighborhood between the current tuple and the next tuple should be locked to ensure the completion of the read operation, a Snei lock may be requested on the next tuple in the index, for an index based read operation. For a table scan, without an index, a Snei lock may be requested on a fictitious end of table tuple.

An insert operation may result in multiple index insertions for the new tuple. For each index insertion the transaction requests a Xnei lock on the neighborhood between the tuple that will be inserted and the existing next tuple on that index. A delete operation requests a similar Xnei lock on the neighborhood between the tuple to be deleted and the next tuple. An update operation consists of index deletes followed by an index update. Thus an update operation consists of two Xnei requests for each effected index. Index deletes executing under serializable isolation may ask for a more restrictive lock mode, such as X, to ensure that no insertion or deletion can happen in the neighborhood.

Using tuple neighborhoods helps in enunciating a clear design for various database actions like read, insert, delete and update. Additionally, lock modes designed based on the concept of tuple neighborhoods provide better concurrency among transactions, as per the semantics of that transaction's isolation level, than previously available.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. Claims are made to all modifications and variation coming within the spirit and scope of the following claims.

The invention claimed is:

1. A computer-readable storage medium having stored thereon instructions that, when executed by a computer, cause the computer to provide a locking scheme comprising:
   granting a first transaction an exclusive lock on a first content item and a weak lock on a neighborhood for the first content item, wherein the first content item includes a first data item and the neighborhood is free space adjacent to the content item that contains no data items and that extends from the first data item to a second adjacent data item; and
   granting a second concurrent transaction an exclusive lock on the second adjacent data item located in the neighborhood.

2. The computer-readable storage medium of claim 1 further having stored thereon instructions that, when executed by a computer, grant the second transaction an exclusive non-serializable lock on the second adjacent content item.

3. The computer-readable storage medium of claim 1, wherein the first content item is a first tuple and the neighborhood is free space adjacent to and associated with the first tuple that extends to an adjacent tuple.

4. The computer-readable storage medium of claim 1 wherein the computer determines an associated set of predetermined access restrictions for the first content item and determines an associated different set of predetermined access restrictions for the neighborhood associated with the first content item.

5. A database management system, comprising: a processor configured to support a neighborhood locking scheme for a neighborhood of free space that contains no data items adjacent to and associated with a first tuple and extending to an adjacent second tuple, the neighborhood locking scheme concurrently creating both a first locking mode for the first tuple, while at the same time creating a second locking mode different from the first locking mode for the neighborhood of free space between the first tuple and the second tuple; and
wherein the neighborhood locking scheme includes a weak exclusive neighborhood lock mode that enables a first transaction to lock the neighborhood of free space for inserting a third tuple within the neighborhood of free space but prevents the first transaction from locking the first or second tuple.

6. A database management system according to claim 5 wherein the weak exclusive neighborhood lock mode enables a second concurrent transaction to modify the third tuple while preventing the second concurrent transaction from having exclusive rights on the neighborhood of free space.

7. The database management system according to claim 5 wherein:
   the first locking mode when first held on the first tuple determines an associated set of predetermined access restrictions for the first tuple and determines an associated different set of predetermined access restrictions for the neighborhood of free space between the first and second tuple; and
   the second locking mode when first held on the neighborhood of free space determines the associated set of predetermined access restrictions for the neighborhood of free space and determines the associated different set of predetermined access restrictions for the first tuple.

8. A database management system, comprising:
   a processor configured to provide a neighborhood locking scheme for a neighborhood of free space that contains no data items adjacent to and associated with a data item;
   wherein the neighborhood locking scheme includes a non-serializable end of scan lock mode that allows a first transaction to only read the neighborhood of free space while preventing the first transaction from reading or writing a tuple associated with, and adjacent to, the neighborhood of free space.

9. A database management system according to claim 8, wherein the non-serializable end of scan lock mode enables a second concurrent transaction to read and write the tuple and modify data adjacent to the neighborhood.

10. A database management system according to claim 8 wherein:
    the neighborhood locking scheme concurrently creates both a first locking mode for the data item, while at the same time creating a second different locking mode for the neighborhood associated with the data item;
    where the first locking mode when first held on the data item determines an associated set of predetermined access restrictions for the data item and determines an associated different set of predetermined access restrictions for the neighborhood associated with the data item;
    where the second locking mode when first held on the neighborhood determines the associated set of predetermined access restrictions for the neighborhood and determines the associated different set of predetermined access restrictions for the data item.

11. A method for controlling access to data items in a database, comprising:
    identifying a neighborhood of free space adjacent to a data item in the database and extending to an adjacent data item, wherein the free space represents a gap in a sequence of the data items;
    granting a non-serializable shared lock for reading the data item with a first set of access privileges; and
    granting a weak exclusive neighborhood lock on the free space in the neighborhood with a second set of access privileges so that a first transaction can read the data item while a second transaction concurrently performs an insert operation into the neighborhood associated with the data item.

12. The method according to claim 11 including:

using a lock mode first held on the data item for determining the first set of access privileges for the data item and the second set of access privileges for the neighborhood; and using the lock mode first held on the neighborhood for determining the first set of access privileges for the data item and the second set of access privileges for the neighborhood.

13. The method according to claim 12 including preventing a first transaction from locking the data item when a second transaction already holds a lock on the neighborhood.

14. The method according to claim 11 including:

providing the first set of access privileges to a first transaction accessing the data item and holding a lock mode on the data item corresponding with the first transaction, wherein the lock mode is a non-serializable shared lock mode and a weak exclusive neighborhood lock is automatically granted to the free space in the neighborhood when the non-serializable shared lock mode is granted for the data item; and automatically providing the second set of access privileges to a second transaction operating independently of the first transaction and accessing the neighborhood associated with the data item, the second set of access privileges determined by the non-serializable shared lock mode already held on the data item by the first transaction.

15. An apparatus for controlling access to data items in a database, comprising:

a processor configured to:

identify a neighborhood of free space adjacent to a data item in the database and extending to an adjacent data item, wherein the free space represents a gap in a sequence of the data items;

gain access for modifying the neighborhood by asserting a weak exclusive neighborhood lock on the neighborhood;

restrict access to the data item according to a predetermined set of lock modes associated with the weak exclusive neighborhood lock; and assigning a set of access privileges to the neighborhood of free space adjacent to the data item in the database responsive to asserting the weak exclusive neighborhood lock on the neighborhood, wherein the set of access privileges assigned to the neighborhood of free space is different from access privileges assigned to the data item by the asserted weak exclusive neighborhood lock.

16. The apparatus according to claim 15 wherein the weak exclusive neighborhood lock enables a first transaction to lock the neighborhood for inserting a new tuple but prevents the first transaction from locking a tuple adjacent to the neighborhood.

17. The apparatus according to claim 15 wherein the processor is further configured to prevent a first transaction from locking the data item when a second independent transaction already holds a lock on the neighborhood.

18. The apparatus according to claim 15 wherein one of the neighborhood locking modes includes a non-serializable end of scan lock mode that allows a first transaction to only read the neighborhood while preventing the first transaction from reading or writing a tuple associated with the neighborhood.

19. The apparatus according to claim 15 wherein the neighborhood corresponds to free space between tuples in a table.

* * * * *

UNITED STATES PATENT AND TRADEMARK OFFICE
CERTIFICATE OF CORRECTION

PATENT NO. : 7,680,794 B2
APPLICATION NO. : 11/757804
DATED : March 16, 2010
INVENTOR(S) : Sanjay Verma et al.

It is certified that error appears in the above-identified patent and that said Letters Patent is hereby corrected as shown below:

Title page 2, in field (56), under "Other Publications", column 1, line 4, delete "Efftient" and insert -- Efficient --, therefor.

Title page 2, in field (56), under "Other Publications", column 1, line 13, delete "1985" and insert -- 1995 --, therefor.

Title page 2, in field (56), under "Other Publications", column 2, line 2, delete "Muitiversion" and insert -- Multiversion --, therefor.

Title page 2, in field (56), under "Other Publications", column 2, line 33, delete "documentatior" and insert -- documentation --, therefor.

Title page 2, in field (56), under "Other Publications", column 2, lines 39-40, delete "Massachusettes" and insert -- Massachusetts --, therefor.

Signed and Sealed this

Seventh Day of December, 2010

David J. Kappos
*Director of the United States Patent and Trademark Office*